US008294670B2

(12) United States Patent
Griffin (10) Patent No.: US 8,294,670 B2
(45) Date of Patent: Oct. 23, 2012

(54) OPTICALLY BASED INPUT MECHANISM FOR A HANDHELD ELECTRONIC COMMUNICATION DEVICE

(75) Inventor: Jason T. Griffin, Kitchener (CA)

(73) Assignee: Research In Motion Limited, Waterloo (CA)

( * ) Notice: Subject to any disclaimer, the term of this patent is extended or adjusted under 35 U.S.C. 154(b) by 1024 days.

(21) Appl. No.: 12/026,381

(22) Filed: Feb. 5, 2008

(65) Prior Publication Data

US 2009/0195499 A1 Aug. 6, 2009

(51) Int. Cl.
*G06F 3/033* (2006.01)

(52) U.S. Cl. ........ 345/157; 345/156; 345/158; 345/184; 345/175

(58) Field of Classification Search .................... 345/157
See application file for complete search history.

(56) References Cited

U.S. PATENT DOCUMENTS

| 4,688,933 | A | * | 8/1987 | Lapeyre | 356/3.16 |
|---|---|---|---|---|---|
| 5,438,331 | A | * | 8/1995 | Gilligan et al. | 341/35 |
| 5,635,926 | A | | 6/1997 | Li | |
| 5,734,370 | A | * | 3/1998 | Skodlar | 345/156 |
| 5,801,681 | A | * | 9/1998 | Sayag | 345/157 |
| 5,805,137 | A | * | 9/1998 | Yasutake | 345/156 |
| 6,057,540 | A | | 5/2000 | Gordon et al. | 250/221 |
| 6,282,303 | B1 | * | 8/2001 | Brownlee | 382/124 |
| 6,300,938 | B1 | * | 10/2001 | Culver | 345/156 |
| 6,633,277 | B1 | * | 10/2003 | Ivanov | 345/167 |
| 6,847,350 | B2 | * | 1/2005 | Van Brocklin et al. | 345/157 |
| 7,038,667 | B1 | * | 5/2006 | Vassallo et al. | 345/184 |
| 7,298,311 | B2 | * | 11/2007 | Horie et al. | 341/176 |
| 7,308,121 | B2 | * | 12/2007 | Mathiassen et al. | 382/124 |
| 7,675,026 | B2 | * | 3/2010 | Lum et al. | 250/231.18 |
| 7,738,916 | B2 | * | 6/2010 | Fukuda | 455/556.1 |
| 7,825,895 | B2 | * | 11/2010 | Bynum et al. | 345/156 |
| 7,860,237 | B2 | * | 12/2010 | Takashima et al. | 379/433.06 |
| 7,978,186 | B2 | * | 7/2011 | Vassallo et al. | 345/184 |
| 8,073,138 | B2 | * | 12/2011 | Takashima et al. | 379/433.06 |
| 2001/0010513 | A1 | * | 8/2001 | Rosenberg et al. | 345/156 |
| 2001/0017934 | A1 | * | 8/2001 | Paloniemi et al. | 382/107 |

(Continued)

FOREIGN PATENT DOCUMENTS

DE 102004054269 5/2006

(Continued)

OTHER PUBLICATIONS

Office Action dated Nov. 11, 2011. In Canadian application No. 2,652,358.

(Continued)

*Primary Examiner* — William Boddie
*Assistant Examiner* — Dorothy Harris
(74) *Attorney, Agent, or Firm* — Novak Druce + Quigg LLP (57) ABSTRACT

Handheld electronic communication device is presented and includes a body with a display screen and an optically based user input device. The optically based user input device is a light-transmissive tubular member. The light-transmissive tubular member has an exposed surface and an image sensor. The handheld electronic communication device further includes a microprocessor which is connected between the image sensor and the display screen. The microprocessor is capable of executing a microprocessor-run program, which receives input data representative of cursor guidance instructions from the image sensor and processes the data for output on the display screen.

10 Claims, 8 Drawing Sheets

U.S. PATENT DOCUMENTS

| | | | |
|---|---|---|---|
| 2001/0038382 A1* | 11/2001 | Griffin et al. | 345/169 |
| 2002/0030668 A1* | 3/2002 | Hoshino et al. | 345/175 |
| 2002/0145588 A1* | 10/2002 | McCahon et al. | 345/156 |
| 2002/0163504 A1* | 11/2002 | Pallakoff | 345/169 |
| 2004/0164954 A1* | 8/2004 | Rekimoto | 345/156 |
| 2005/0012714 A1* | 1/2005 | Russo et al. | 345/157 |
| 2005/0068292 A1* | 3/2005 | Duarte et al. | 345/156 |
| 2006/0007129 A1* | 1/2006 | Pletikosa | 345/156 |
| 2006/0028442 A1* | 2/2006 | Bynum et al. | 345/157 |
| 2006/0034499 A1* | 2/2006 | Shinoda et al. | 382/124 |
| 2006/0093192 A1* | 5/2006 | Bechtel | 382/126 |
| 2006/0274038 A1 | 12/2006 | Redkov | |
| 2006/0284831 A1* | 12/2006 | Rosenberg | 345/156 |
| 2007/0063969 A1* | 3/2007 | Wright | 345/156 |
| 2007/0242047 A1 | 10/2007 | Griffin | |

FOREIGN PATENT DOCUMENTS

| | | |
|---|---|---|
| EP | 1752865 | 2/2007 |
| EP | 1816549 | 8/2007 |
| WO | 0237411 | 5/2002 |
| WO | 2005119419 A1 | 12/2005 |

OTHER PUBLICATIONS

Examination Report dated Feb. 9, 2010. In corresponding application No. 08151078.6.

* cited by examiner

OPTICALLY BASED INPUT MECHANISM FOR A HANDHELD ELECTRONIC COMMUNICATION DEVICE

FIELD

This disclosure, in a broad sense, is directed toward a handheld electronic communication device that has wireless communication capabilities and the networks within which the handheld electronic communication device operates. More particularly, the disclosure relates to mechanisms which allow an operator to "navigate" displayed screens on the device and to enter commands into the device.

BACKGROUND

With the proliferation of wireless communication systems, compatible handheld communication devices are becoming more prevalent, as well as advanced. Whereas in the past such handheld communication devices were typically limited to either voice transmission (cell phones) or text transmission (pagers and PDAs), today's consumer often demands a multifunctional device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Keyboards are used on many handheld electronic communication devices, including telephones and mobile communication devices. The size of keyboards has been reduced over the years, as newer, smaller devices have become popular. Cell phones, for example, are now sized to fit in one's pocket or the palm of the hand. As the size of the devices has decreased, the more important it has become to utilize the entire keyboard surface as efficiently as possible.

Many keyboards on mobile devices have an input device for navigation through the graphical user interface. These interfaces include such devices as trackballs and rotating wheels which can be used to effect movement of a cursor or pointer, or to scroll up, down and about a displayed page. These navigation devices often occupy a disproportionately large amount of space on the incorporating mobile device. Moreover, they use mechanical components to detect motion of the input device. These mechanical components can wear out over time or can become fouled with dirt, skin oils, and other similar contaminants.

BRIEF DESCRIPTION OF THE DRAWINGS

Exemplary methods and arrangements conducted and configured according to the advantageous solutions presented herein are depicted in the accompanying drawings wherein:

FIG. 9A illustrates a close-up view of the embodiment of an optically based user input device shown in FIG. 8; and.

DETAILED DESCRIPTION

Figure 1:
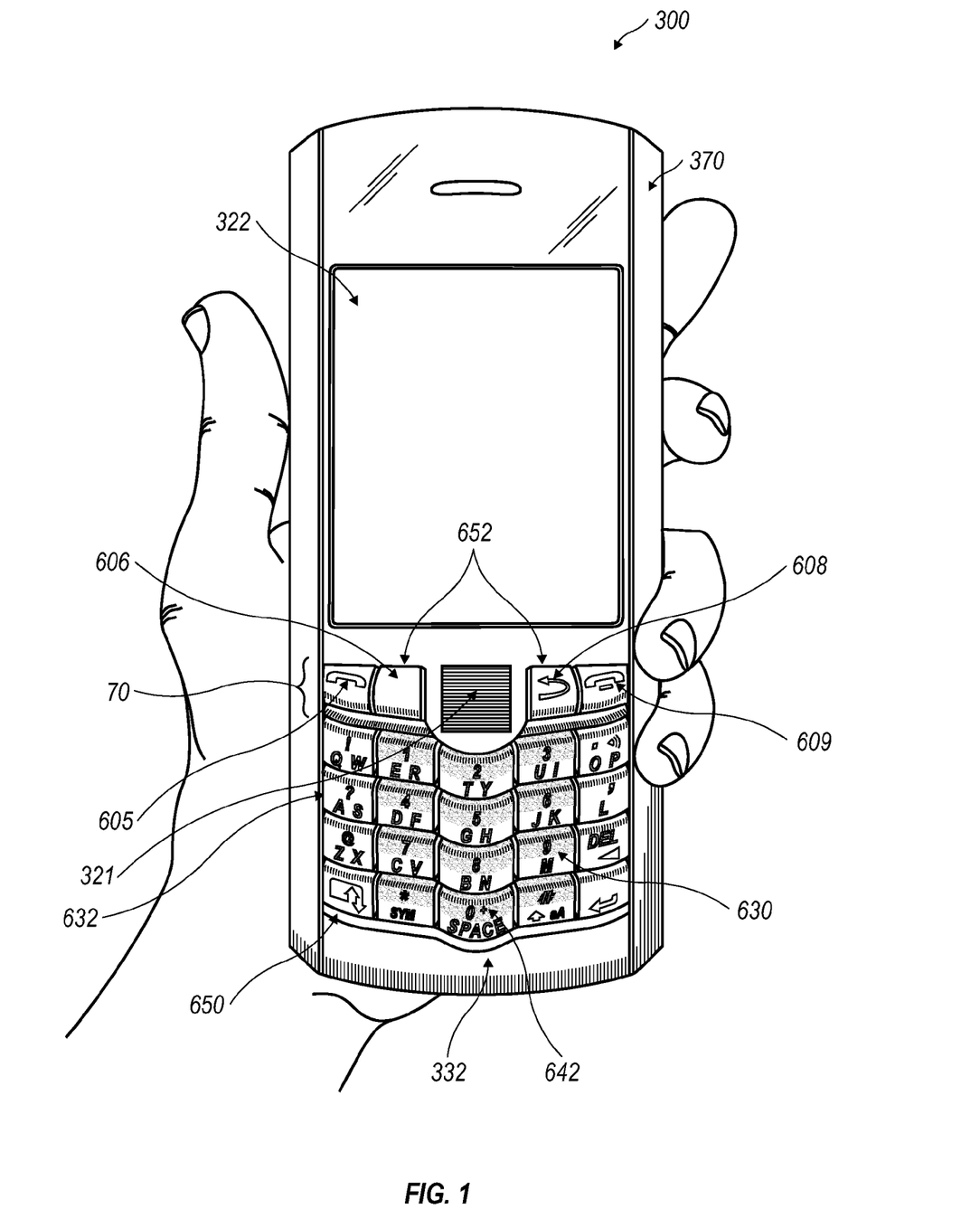
FIG. 1 illustrates a first embodiment of an exemplary handheld communication device, cradled in the palm of a user's hand, having an optically based user input device.
Figure 2:
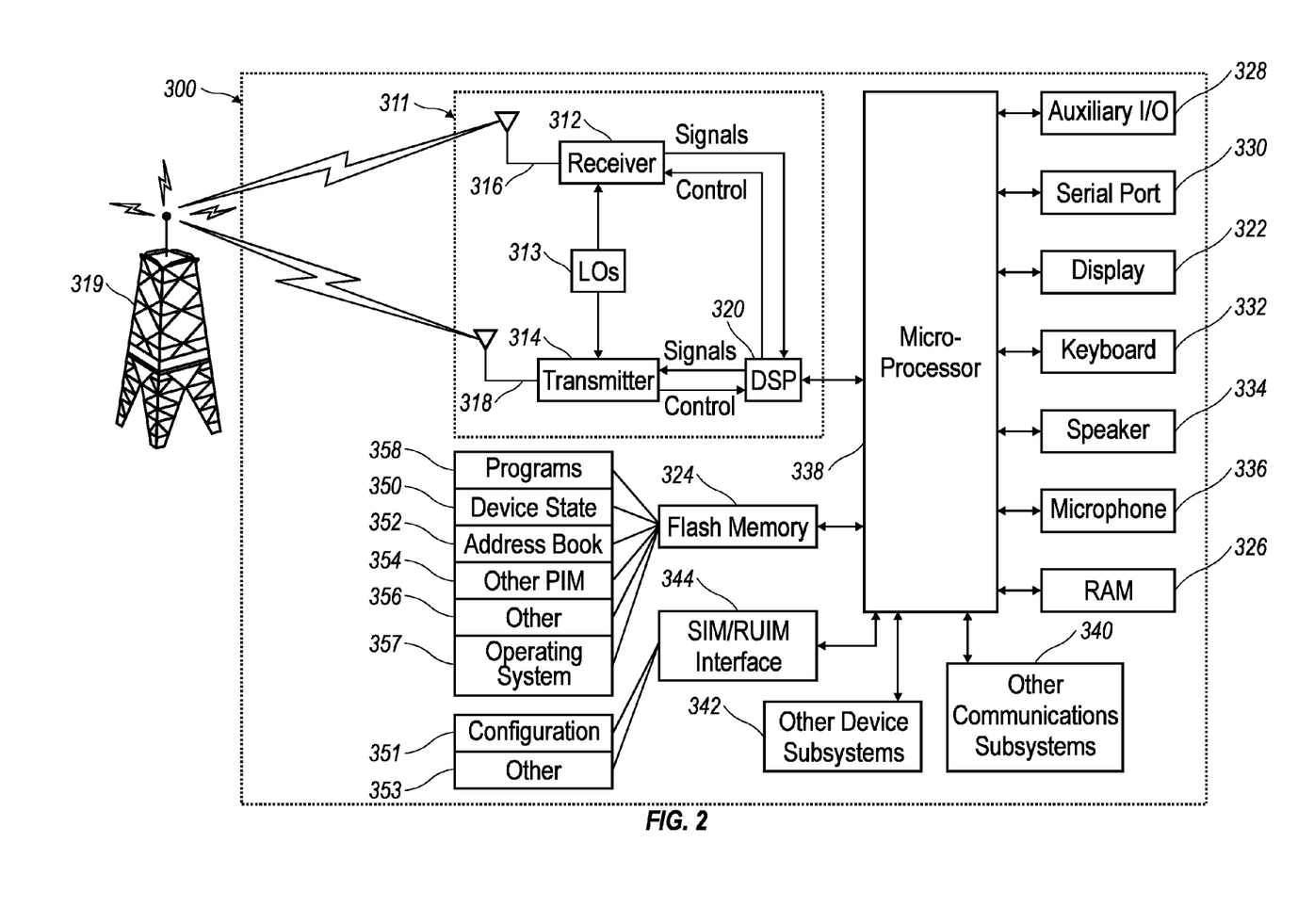
FIG. 2 is a block diagram representing a wireless handheld communication device interacting in a communication network.

An exemplary handheld electronic communication device 300 is shown in FIG. 1, and the device's cooperation in a wireless network 319 is exemplified in the block diagram of FIG. 2. These figures are exemplary only, and those persons skilled in the art will appreciate the additional elements and modifications necessary to make the handheld electronic communication device 300 work in particular network environments.

As shown in the block diagram of FIG. 2, the handheld electronic communication device 300 includes a microprocessor 338 that controls the operation of the handheld electronic communication device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display screen 322, a keyboard 332, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or a Wi-Fi communication module (a communication module in compliance with IEEE 802.11b) and associated circuits and components. Additionally, the microprocessor 338 is able to perform operating system functions and preferably enables execution of software applications on the handheld electronic communication device 300.

In general, the auxiliary I/O subsystem 328 can take the form of a variety of different navigation tools (multi-directional or single-directional) such as an optically based user input device which can include but is not limited to embodiments 321 and 327 as described in this disclosure and as illustrated in the exemplary embodiment shown in FIGS. 1, 7A, 7B, 8, 9A and 9B. These optically based user input devices are preferably located on the front surface of the handheld electronic communication device 300 but may be located on any exterior surface of the handheld electronic communication device 300. Other auxiliary I/O subsystems can include external display devices and externally connected keyboards (not shown). While the above examples have been provided in relation to the auxiliary I/O subsystem 328, other subsystems capable of providing input or receiving output from the handheld electronic communication device 300 are considered within the scope of this disclosure. Additionally, other keys may be placed along the side of the handheld electronic communication device 300 to function as escape keys, volume control keys, scrolling keys, power switches, or user programmable keys and may likewise be programmed accordingly.

As may be appreciated from FIG. 1, the handheld electronic communication device 300 comprises a lighted display screen 322 located above a keyboard 332 constituting a user input and suitable for accommodating textual input to the handheld electronic communication device 300. The front face of the body 370 of the handheld electronic communication device has a navigation row 70 and a key field 650 that includes alphanumeric input keys 630, alphabetic input keys 632, numeric input keys 642, and other function keys as shown in FIG. 1. As shown, the handheld electronic communication device 300 is of unibody construction, also known as a "candy-bar" design.

Figure 10:
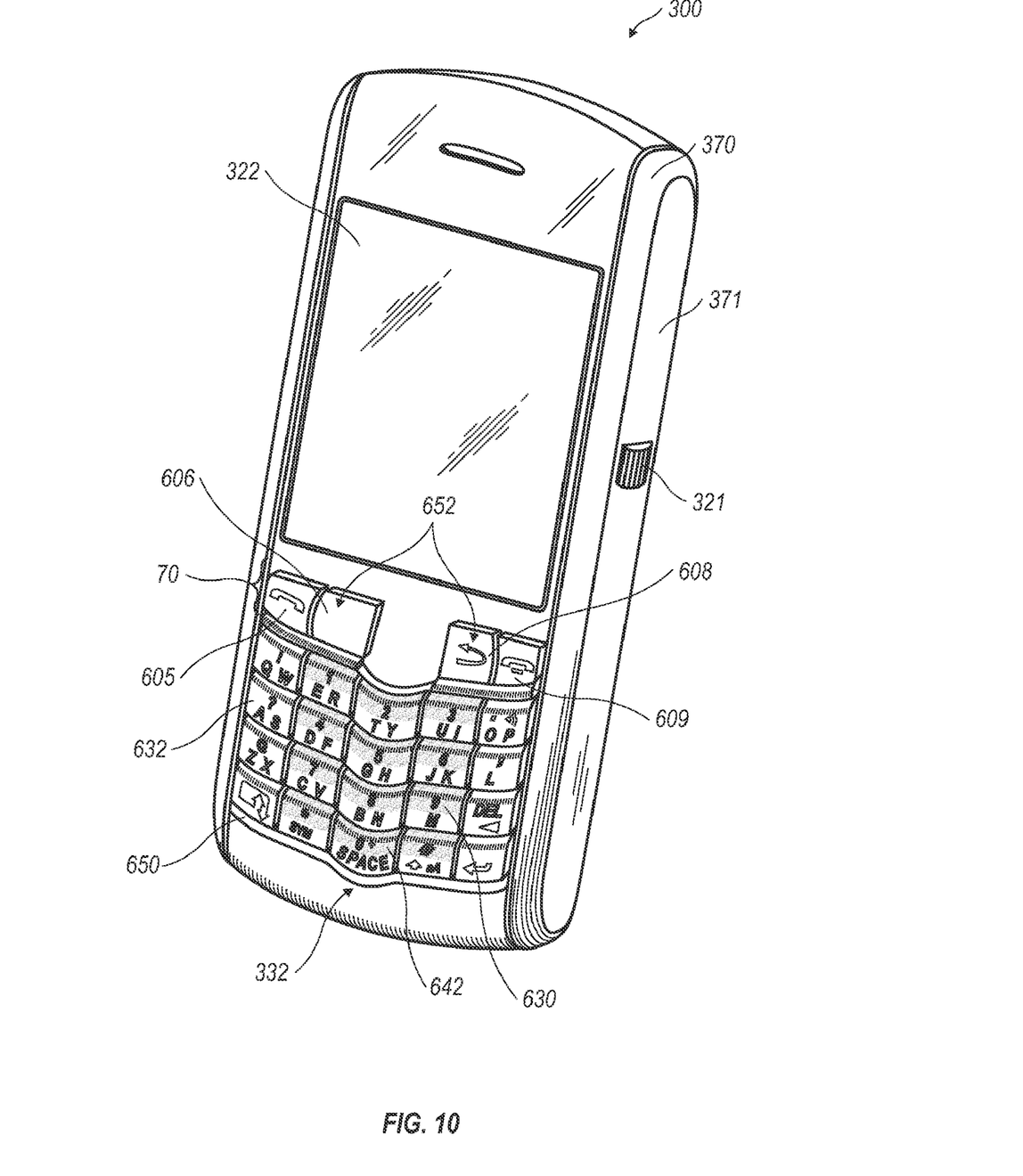
FIG. 10 illustrates a side, perspective view of an exemplary handheld communication device having an optically based user input device located on the side of the handheld communication device.

Keys, typically of a push-button or push-pad nature, perform well as data entry devices but present problems to the user when they must also be used to effect navigational control over a screen-cursor. In order to solve this problem, the present handheld electronic communication device 300 preferably includes an auxiliary input that acts as a cursor navigational tool and which is also exteriorly located upon the front face of the body 370 of the handheld electronic communication device 300. Its front face location is particularly advantageous because it makes the tool easily thumb-actuable like the keys of the keyboard. A particularly usable embodiment provides the navigational tool in the form of an optically based user input device, further details of which are provided below and in FIGS. 7A, 7B and 8, which can be easily utilized to instruct two-dimensional screen cursor movement in substantially any direction, as well as act as an actuator when the optically based user input device is depressed like a button. The placement of the optically based user input device can be above the keyboard 332 and below the display screen 322; here, it avoids interference during keyboarding and does not block the user's view of the display screen 322 during use. (See FIG. 1). In at least one embodiment, device 300 includes a body 370 having a left side-wall and a right side-wall 371. The optically based user input device can be located to the left or the right of the display screen 322 on the front face of the body 370 of the handheld electronic communication device 300, thus allowing the user to easily operate the optically based user input device 321 while still viewing the display screen 322. In yet another embodiment, shown in FIG. 10, the body 370 of the handheld electronic communication device 300 has a right side wall and the optically based user input device is located on the right side wall of the device.

Figure 6:
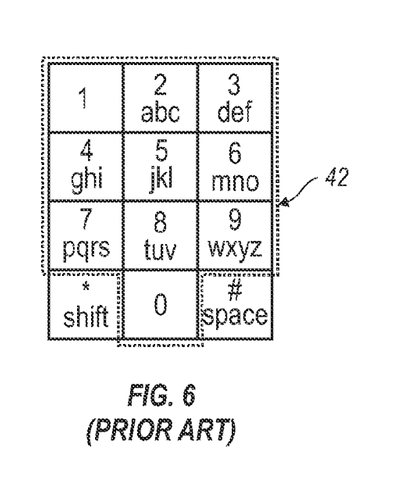
FIG. 6 illustrates a traditional or standard phone key arrangement or layout according to the ITU Standard E.161 including both numerals and letters.

As illustrated in FIGS. 1 and 2, the present disclosure is directed to a handheld electronic communication device 300 configured to send and receive text messages. The handheld electronic communication device 300 includes a hand cradleable body configured to be held in one hand by an operator of the device during text entry. A display screen 322 is included that is located on a front face of the body 370 and upon which information is displayed to the operator during text entry. A key field 650 is also located on the front face of the body 370 and comprises a plurality of keys including a plurality of alphanumeric keys, symbol keys, and function keys. A navigation row 70 including menu keys 652 and an optically based user input device is also located on the front face of the body 370. The alphanumeric input keys 630 comprise a plurality of alphabetic and numeric input keys 632, 642 having letters and numbers associated therewith. The order of the letters of the alphabetic input keys 632 on the presently disclosed handheld electronic communication device can be described as being of a traditional, but non-ITU Standard E.161 layout. This terminology has been utilized to delineate the fact that such a telephone keypad as depicted in FIG. 6 may not allow for efficient text entry on the handheld electronic communication device 300.

The handheld electronic communication device 300 is also configured to send and receive voice communications such as mobile telephone calls. To facilitate telephone calls, two call keys 605, 609 ("outer keys") are provided in the upper, navigation row 70 (so-called because it includes the optically based user input device) at the outer ends of the navigation row 70. One of the two call keys is a call initiation key 605, and the other is a call termination key 609. The navigation row 70 also includes another pair of keys ("flanking keys") that are located immediately adjacent to the optically based user input device, with one flanking key on either side of the optically based user input device. It is noted that the outer keys are referred to as such not because they are necessarily the outermost keys in the navigation row—there may be additional keys located even further outwardly of the outer keys if desired—but rather because they are located outwardly with respect to the flanking keys. The flanking keys may, for instance, constitute the menu keys 652, which include a menu call-up key 606 and an escape or back key 608. The menu call-up key 606 is used to bring up a menu on the display screen 322 and the escape key 608 is used to return to the previous screen or previous menu selection. The functions of the call keys and the menu keys may, of course, be provided by buttons that are located elsewhere on the device, with different functions assigned to the outer keys and the flanking keys.

Furthermore, the device is equipped with components to enable operation of various programs, as shown in FIG. 2. In an exemplary embodiment, the flash memory 324 is enabled to provide a storage location for the operating system 357, application programs 358, and data. The operating system 357 is generally configured to manage other application programs 358 that are also stored in flash memory 324 and executable on the microprocessor 338. The operating system 357 honors requests for services made by application programs 358 through predefined application program 358 interfaces. More specifically, the operating system 357 typically determines the order in which multiple application programs 358 are executed on the microprocessor 338 and the execution time allotted for each application program 358, manages the sharing of flash memory 324 among multiple application programs 358, handles input and output to and from other device subsystems 342, and so on. In addition, users can typically interact directly with the operating system 357 through a user interface usually including the keyboard 332 and display screen 322. While in an exemplary embodiment the operating system 357 is stored in flash memory 324, the operating system 357 in other embodiments is stored in read-only memory (ROM) or similar storage element (not shown). As those skilled in the art will appreciate, the operating system 357, device application program 358 or parts thereof may be loaded in RAM 326 or other volatile memory.

In one exemplary embodiment, the flash memory 324 contains application programs 358 for execution on the handheld electronic communication device 300 including an address book 352, a personal information manager (PIM) 354, and the device state 350. Furthermore, application programs 358 and other information 356 including data can be segregated upon storage in the flash memory 324 of the handheld electronic communication device 300.

When the handheld electronic communication device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UMMS) network, the Enhanced Data for Global Evolution (EDGE) network, and the Code Division Multiple Access (CDMA) network and those networks, generally described as packet-switched, narrowband, data-only technologies which are mainly used for short burst wireless data transfer. For the systems listed above, the handheld electronic communication device 300 must be properly enabled to transmit and receive signals from the communication network 319. Other systems may not require such identifying information. GPRS, UMTS, and EDGE require the use of a Subscriber Identity Module (SIM) in order to allow communication with the communication network 319. Likewise, most CDMA systems require the use of a Removable Identity Module (RUIM) in order to communicate with the CDMA network. The RUIM and SIM card can be used in multiple different handheld electronic communication devices 300. The handheld electronic communication device 300 may be able to operate some features without a SIM/RUIM card, but it will not be able to communicate with the network 319. A SIM/RUIM interface 344 located within the handheld electronic communication device 300 allows for removal or insertion of a SIM/RUIM card (not shown). The SIM/RUIM card features memory and holds key configurations 351, and other information 353 such as identification and subscriber related information. With a properly enabled handheld electronic communication device 300, two-way communication between the handheld electronic communication device 300 and communication network 319 is possible.

If the handheld electronic communication device 300 is enabled as described above or the communication network 319 does not require such enablement, the two-way communication enabled handheld electronic communication device 300 is able to both transmit and receive information from the communication network 319. The transfer of communication can be from the handheld electronic communication device 300 or to the handheld electronic communication device 300. In order to communicate with the communication network 319, the handheld electronic communication device 300 in the presently described exemplary embodiment is equipped with an integral or internal antenna 318 for transmitting signals to the communication network 319. Likewise the handheld electronic communication device 300 in the presently described exemplary embodiment is equipped with another antenna 316 for receiving communication from the communication network 319. These antennae (316, 318) in another exemplary embodiment are combined into a single antenna (not shown). As one skilled in the art would appreciate, the antenna or antennae (316, 318) in another embodiment are externally mounted on the handheld electronic communication device 300.

When equipped for two-way communication, the handheld electronic communication device 300 features a communication subsystem 311. As is well known in the art, this communication subsystem 311 is modified so that it can support the operational needs of the handheld electronic communication device 300. The subsystem 311 includes a transmitter 314 and receiver 312 including the associated antenna or antennae (316, 318) as described above, local oscillators (LOs) 313, and a processing module 320 which in the presently described exemplary embodiment is a digital signal processor (DSP) 320.

It is contemplated that communication by the handheld electronic communication device 300 with the wireless network 319 can be any type of communication that both the wireless network 319 and handheld electronic communication device 300 are enabled to transmit, receive and process. In general, these can be classified as voice and data. Voice communication is communication in which signals for audible sounds are transmitted by the handheld electronic communication device 300 through the communication network 319. Data is all other types of communication that the handheld electronic communication device 300 is capable of performing within the constraints of the wireless network 319.

Example device applications that can depend on such data include email, contacts and calendars. For each such application synchronization with home-based versions on the applications can be critical for either or both of their long term and short term utility. As an example, emails are often time sensitive, so substantially real time synchronization is highly desirable. Contacts, on the other hand, can be usually updated less frequently without inconvenience. Therefore, the utility of the handheld electronic communication device 300 is significantly enhanced (if not enabled) when connectable within a communication system, and particularly when connectable on a wireless basis in a network 319 in which voice, text messaging, and other data transfer are accommodated.

As intimated hereinabove, one of the more important aspects of the handheld electronic communication device 300 to which this disclosure is directed is its size. While some users will grasp the handheld electronic communication device 300 in both hands, it is intended that a predominance of users will cradle the handheld electronic communication device 300 in one hand in such a manner that input and control over the handheld electronic communication device 300 can be effected using the thumb of the same hand in which the handheld electronic communication device 300 is held. However, it is appreciated that additional control can be effected by using both hands. The size of the handheld electronic communication device 300 must be kept commensurately small, in order to have a handheld electronic communication device 300 that is easy to grasp and desirably pocketable. Of the device's dimensions, limiting its width is important for the purpose of assuring cradleability in a user's hand. Moreover, it is preferred that the width of the handheld electronic communication device 300 be maintained at less than eight centimeters (approximately three inches). Keeping the handheld electronic communication device 300 within these dimensional limits provides a hand cradleable unit that users prefer for its usability and portability. Limitations with respect to the height (length) of the handheld electronic communication device 300 are less stringent when considering hand-cradleability. Therefore, in order to gain greater size, the handheld electronic communication device 300 can be advantageously elongated so that its height is greater than its width, but still remains easily supported and operated in one hand.

A potential drawback is presented by the small size of the handheld electronic communication device 300 in that there is limited exterior surface area for the inclusion of user input and device output features. This is especially true for the "prime real estate" on the front face of the body 370 of the handheld electronic communication device 300, where it is most advantageous to include a display screen 322 that outputs information to the user. The display screen 322 is preferably located above a keyboard 332 that is utilized for data entry into the handheld electronic communication device 300 by the user. If the display screen 322 is provided below the keyboard 332, a problem occurs in that viewing the display screen 322 is inhibited when the user is inputting data using the keyboard 332. Therefore it is preferred that the display screen 322 be above the input area, thereby solving the problem by assuring that the hands and fingers do not block the view of the display screen 322 during data entry periods.

To facilitate textual data entry into the handheld electronic communication device 300, a keyboard 332 is provided. In the exemplary illustrated embodiment of FIG. 8, a full alphabetic keyboard 332 is utilized in which there is one key per letter (with some of the letter keys also having numbers, symbols, or functions associated with them). In this regard, the associated letters can be advantageously organized in QWERTY, QWERTZ, AZERTY, or Dvorak layouts, among others, thereby capitalizing on certain users' familiarity with these various letter orders. In order to stay within the bounds of the limited front surface area, however, each of the keys must be commensurately small when, for example, twenty-six keys must be provided in the instance of the English language.

As shown in FIG. 1, the handheld electronic communication device 300 is cradleable in the palm of a user's hand. The handheld electronic communication device 300 is provided with a keyboard 332 to enter text data and place telephone calls and a display screen 322 for communicating information to the user. A connect/send key 605 is preferably provided to aid in the placement of a phone call. Additionally, a disconnect/end key 609 is provided. The send key 605 and end key 609 preferably are arranged in the navigation row 70 including the optically based user input device navigation tool 321. Additionally, the navigation row 70 preferably has a menu call-up key 606 and a back key or escape key 608.

The keyboard 332 includes a plurality of keys that can be of a physical nature such as actuable buttons, or they can be of a software nature, typically constituted by virtual representations of physical keys on a display screen 322 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application program 358 or feature in use, specific keys can be enabled or disabled.

In the case of physical keys, all or a portion of the plurality of keys have one or more indicia representing character(s), command(s), functions(s), or a combination including one or more of character(s), command(s), and function(s) displayed at on one or more of their top surface and on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the display screen 322.

In the case of virtual keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular application or feature of the handheld electronic communication device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figure 3A:
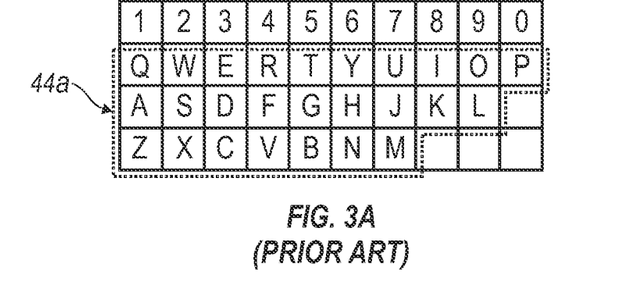
FIG. 3A illustrates an exemplary QWERTY keyboard layout.
Figure 3B:
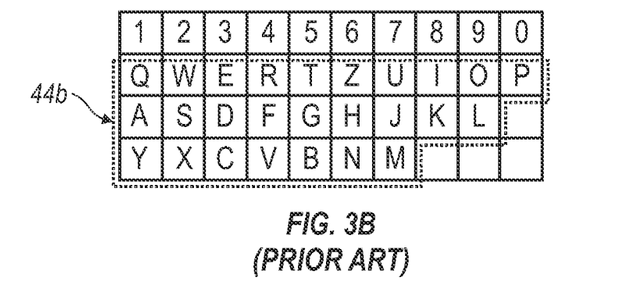
FIG. 3B illustrates an exemplary QWERTZ keyboard layout.
Figure 3C:
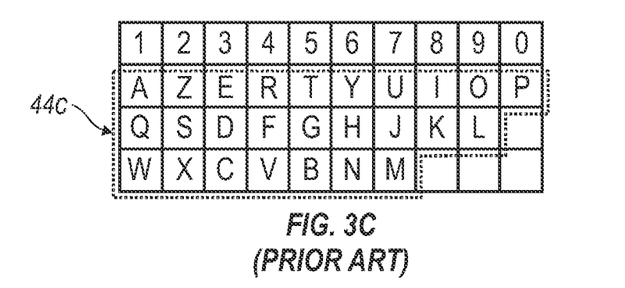
FIG. 3C illustrates an exemplary AZERTY keyboard layout.
Figure 3D:
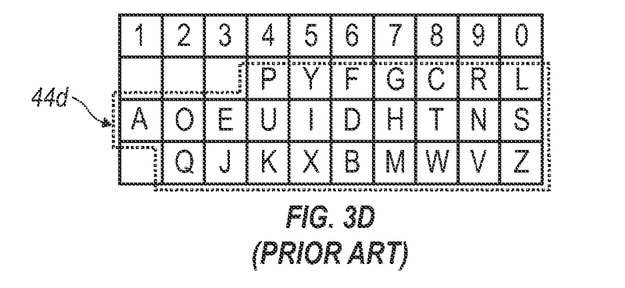
FIG. 3D illustrates an exemplary Dvorak keyboard layout.

The various characters, commands, and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44a shown in FIG. 3A. The QWERTZ keyboard layout is normally used in German-speaking regions; this alphabetic key arrangement 44b is shown in FIG. 3B. The AZERTY keyboard layout 44c is normally used in French-speaking regions and is shown in FIG. 3C. The Dvorak keyboard layout was designed to allow typists to type faster; this alphabetic key arrangement 44d is shown in FIG. 3D. In other exemplary embodiments, keyboards having multi-language key arrangements can be implemented.

Figure 4:
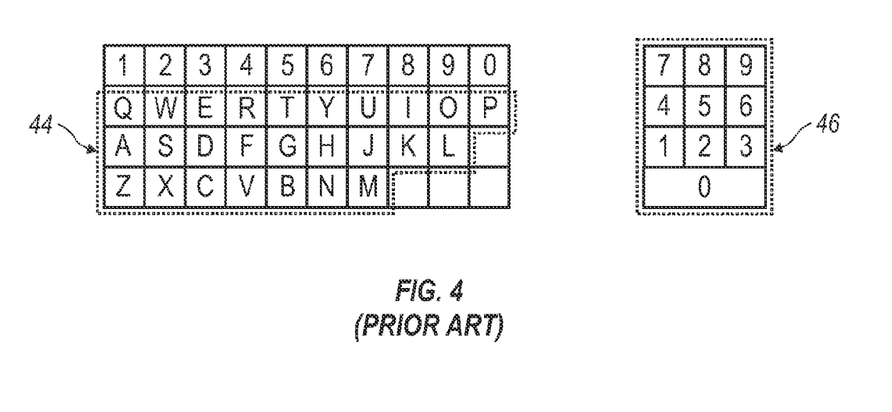
FIG. 4 illustrates a QWERTY keyboard layout paired with a traditional ten-key keyboard.

Alphabetic key arrangements are often presented along with numeric key arrangements. Typically, the numbers 1-9 and 0 are positioned in the row above the alphabetic keys 44a-d, as shown in FIG. 3A-D. Alternatively, the numbers share keys with the alphabetic characters, such as the top row of the QWERTY keyboard. Yet another exemplary numeric key arrangement is shown in FIG. 4, where a "ten-key" style numeric keypad 46 is provided on a separate set of keys that is spaced from the alphabetic/numeric key arrangement 44. Still further, ten-key numeric arrangements may be common with or shared with a subset of the alphabetic keys. A ten-key styled numeric keypad includes the numbers "7", "8", "9"

arranged in a top row; "4", "5", "6" arranged in a second row; "1", "2", "3" arranged in a third row; and "0" in a bottom row.

Figure 5:
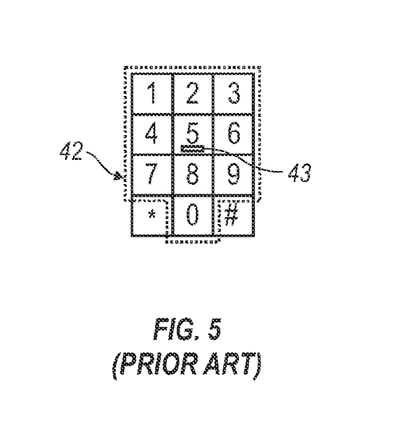
FIG. 5 illustrates ten digits comprising the numerals 0-9 arranged in a traditional, ITU Standard E.161 numeric telephone keypad layout, including the * and # keys flanking the 0 key.

Further, a numeric phone key arrangement 42 is exemplarily illustrated in FIG. 5. As shown in FIG. 5, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld devices 300 to include a combined text-entry keyboard and a telephony keyboard. Examples of such handheld devices 300 include mobile stations, cellular telephones, wireless personal digital assistants (PDAs), two-way paging devices, and others. Various keyboards are used with such devices and can be termed a full keyboard, a reduced-format keyboard, or phone key pad. In embodiments of a handheld device 300 having a full keyboard, the alphabetic characters are singly associated with the plurality of physical keys. Thus, in an English-language keyboard of this configuration, there are at least 26 keys in the plurality, with one letter per alphabetic key.

FIGS. 5 and 6 both feature numeric keys arranged according to the ITU Standard E.161 form. In addition, FIG. 6 also incorporates alphabetic characters according to the ITU Standard E.161 layout as well. The International Telecommunications Union ("ITU") has established phone standards for the arrangement of alphanumeric keys. The standard phone numeric key arrangement shown in FIGS. 5 (no alphabetic letters) and 6 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. As shown in FIG. 4, the numeric key arrangement can be overlaid on a QWERTY arrangement. The numeric arrangement as shown can be aptly described as a top-to-bottom ascending order three-by-three-over-zero pattern.

While several keyboard layouts have been described above, the layouts can be described as having keys disposed on the keyboard in a QWERTY, reduced QWERTY, QWERTZ, Dvorak, or AZERTY key layout. These familiar keyboard layouts allow users to type more intuitively and more quickly than, for example, on the standard alphabetic layout on a telephone pad. As mentioned above, the key arrangements can be reduced compared to a standard layout through the use of more than one letter or character per key. By utilizing fewer keys, the keys can be made larger and therefore more convenient to the user.

Figure 7A:
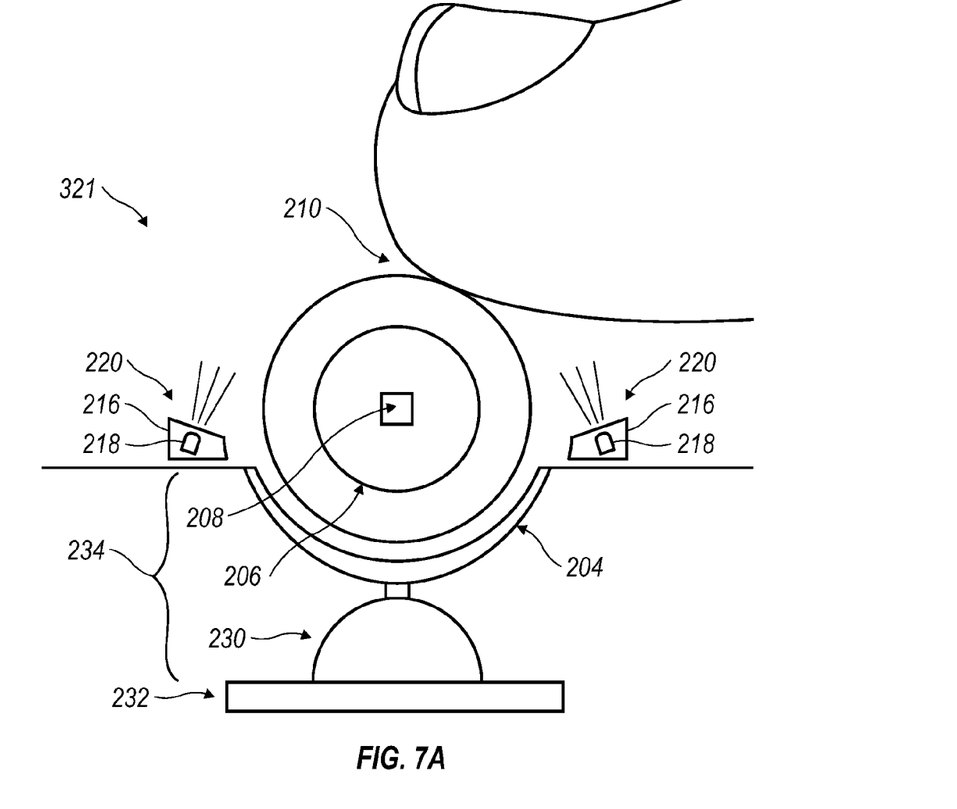
FIG. 7A illustrates an embodiment of an optically based user input device according to this disclosure.
Figure 7B:
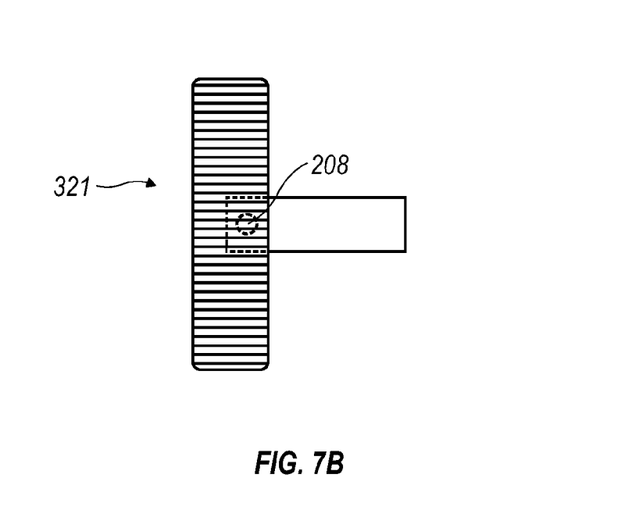
FIG. 7B illustrates a front elevation view of the optically based user input device shown in FIG. 7A.
Figure 8:
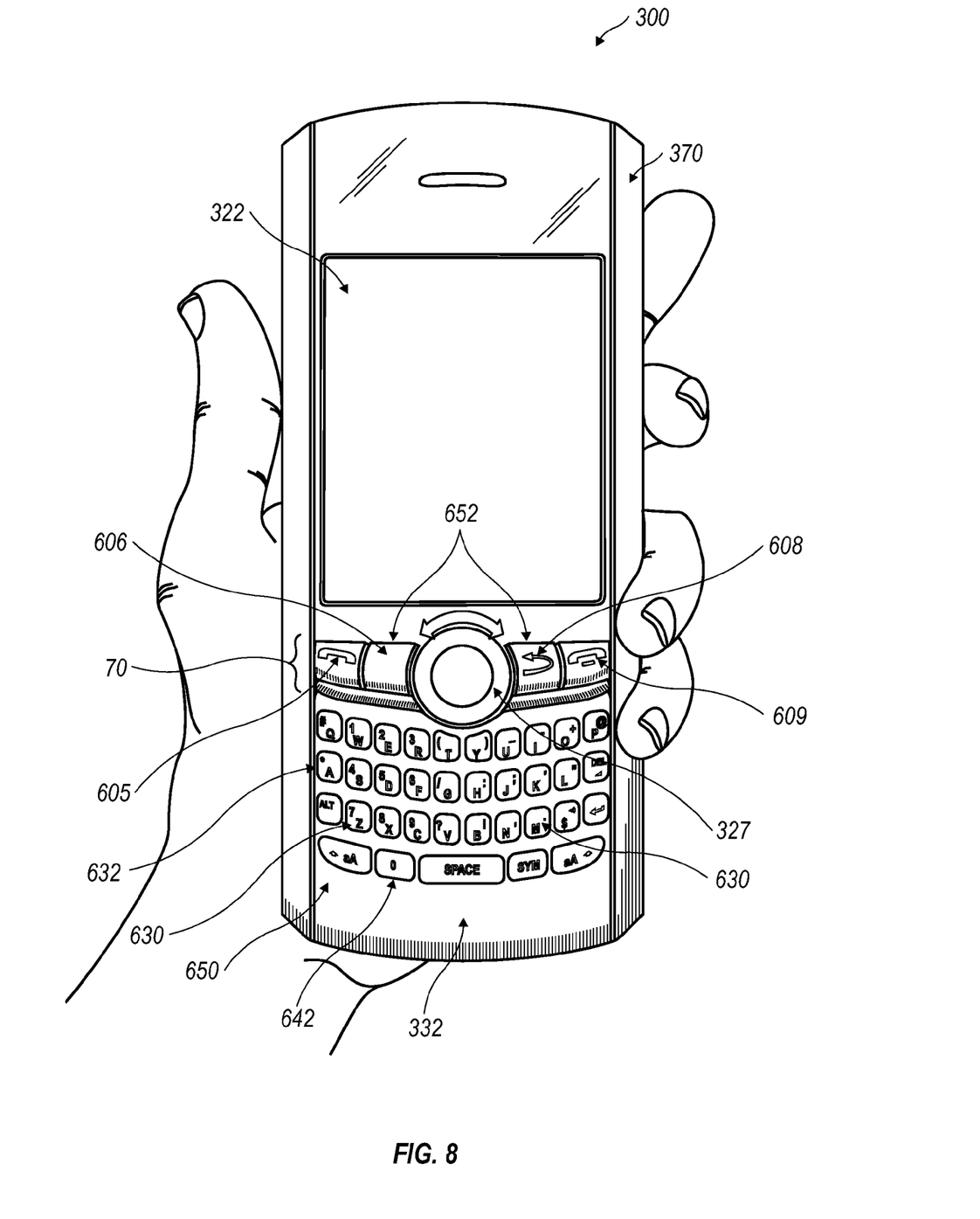
FIG. 8 illustrates another embodiment of an exemplary handheld communication device, cradled in the palm of a user's hand, having an optically based user input device.

As noted above, a navigation tool according to this disclosure suitably features an optically based user input device which can include but is not limited to embodiments shown in FIGS. 1 and 8. Furthermore, a microprocessor can be communicatively connected between an image sensor (see discussion below in relation to FIGS. 7A, 7B, 9A and 9B) and the display screen 322 of handheld electronic communication device 300. A microprocessor-run software program can be provided as well. The microprocessor-run software program is programmed to receive input data representative of cursor guidance instructions sensed by the image sensor and to process the input data and output corresponding cursor control data to the display screen 322. The cursor guidance instructions will be discussed further in relation to particular embodiments.

In general, in one embodiment, the input device features a light-transmissive (transparent or translucent) tubular member 321, a light source to illuminate a user's finger and a sensor to capture the finger's instructive movement as the user slides his finger over the tubular member 321. In this configuration, the light-transmissive tubular member 321 can be configured to remain in a fixed position, but the optically based user input device still features optically based sensing devices to measure rotational and translational forces over the tubular member 321. The tubular member 321 can also be configured to rotate upon application of a rotational force by the user's finger. The rotational movement of the tubular member 321 can be used to scroll through selections up and down the display screen 322. The tubular member 321 can be depressed to make various selections appearing in the display screen 322. In at least one embodiment the optical sensor can recognize cursor navigation instruction when the tubular member 321 is either stationary or rotating. In this configuration, if the tubular member 321 is prevented from rotating, it is possible to continue to measure cursor navigation instruction using the optical sensor to detect motion on the surface of the tubular member 321. While the description as provided herein refers to a user's finger, the description equally applies to other ways in which a user could actuate the tubular member 321 including through the use of a thumb or other digit.

Additionally, the top and bottom edge of the tubular member 321 can be pivotally urged during depression to the left or right relative to the front face of the body 370 of the handheld electronic communication device 300 by the application of a pivoting force by the user's finger to make selections appearing on the display screen 322. Furthermore, this right or left movement of the tubular member 321 can provide an additional dimension for cursor navigation on the display screen 322. If the tubular member 321 is actuated to right it can cause the cursor to move to the right on the display screen 322. Likewise, if the tubular member 321 is actuated to the left it can cause the cursor to move to the left on the display screen 322. The right or left movement of the tubular member 321 can also be implemented to direct other on screen cursor movement.

In another embodiment, the optically based user input device features a light-transmissive disc-shaped member 327 that can be configured to remain in a fixed position, but the optically based user input device still features optically based sensing devices to measure rotational and translational forces over the disc-shaped member 327. The disc-shaped member 327 can also be configured to rotate upon application of a rotational force by the user's finger. The rotational movement of the disc-shaped member 327 can be used to scroll through selections up and down the display screen 322. The disc-shaped member can be used to enter additional commands by depressing certain portions of the disc-shaped member 327. For example, the edge of the disc-shaped member 327 can be pivotally urged during depression in a right, left, up, or down direction, allowing the disc-shaped member to cause cursor navigation in the respective direction on the display screen 322. In other embodiments, the disc-shaped member can command cursor navigation in diagonal directions.

In other words, in both embodiments, the optically based user input device can be fixed, pivoted, depressed or rotated and optical rather than mechanical means are used to measure movement of the user's finger and translate that movement into a navigational command to the handheld electronic communication device 300. The optically based user input device can be implemented using various forms of light including but not limited to visible light, infrared light, laser, and the like. The optically based user input device can be further configured such that an entry command (for example, selection of a graphical user interface icon, a highlighted menu item, and the like) can be entered by depressing the optically based user input device.

More particularly, one embodiment of an optically based user input device is illustrated in FIGS. 7A and 7B. As illustrated, one embodiment of the optically based user input device is a light-transmissive (for example, transparent, semi-transparent or translucent) tubular member 321 that can be mounted upon a depressible suspension 234. In one example, the depressible suspension includes a cup-shaped receiver 204, such that the tubular member 321 can protrude slightly above the body (not shown) of the handheld electronic communication device 300. The degree of protrusion of the tubular member 321 can be modified. The light-transmissive tubular member 321, which can be sized on the order of magnitude of a user's fingertip, can be suitably formed from plastic or glass and can have a hollow interior region 206. An optical image sensor 208, for example, a charge-coupled device (CCD), can be housed within the light-transmissive tubular member 321 and is also suitably supported on the cup-shaped receiver 204. In general, the optical image sensor 208 registers the image of the region of contact 210 of the user's finger against the light-transmissive tubular member 321; by comparing that image with previous images, software within the handheld electronic communication device 300 is able to determine the direction and amount of movement of the user's finger over the surface of the light-transmissive tubular member 321.

Furthermore, it is possible to configure the optical image sensor 208 to register motion of the tubular member 321. In this configuration, the motion of the tubular member can be detected using a previous image of the tubular member and comparing its relative motion. In yet another embodiment, the optical image sensor 208 detect motion of the user's finger while the tubular member 321 rotates. The detection of the finger movement can be as described above. In yet another embodiment, the optical image sensor 208 detects both finger movement and rotation of the tubular member 321.

The location of the image sensor should be configured such that it can register the input motion as described above. In one embodiment, the tubular member has a cross section such that it resembles a ring. This enables the image sensor to be mounted within an interior space of the tubular member 321.

Still further, to enhance image-acquisition by the image sensor 208, a light source may be provided to illuminate the user's finger. For example, a light-guide may be provided through a light-transmissive ring 216 that surrounds the light-transmissive tubular member 321 and that is supported by the body of the handheld device (not shown). The light-transmissive ring 216 has one or more light sources 218 (for example, light-emitting diodes (LEDs)) embedded therein, which light sources 218 are able to illuminate the user's fingertip or surface of the tubular member 321. In alternative embodiments, the light source may be provided by means of the main LCD screen of the device or by means of any keypad lighting device, with a suitable mechanism (for example, a light guide) to shine light from at least one of the LCD and keyboard 332 onto the user's fingertip. Alternatively, the multiple light sources may be used in combination for providing illumination of the tubular member 321. Furthermore, the light source 218 can be variously controlled and oriented to shine light through the light-transmissive tubular member 321 in dependence upon an executing feature function of the handheld electronic communication device 300. The executing feature functions can include a ringtone, a music file playing on the device 300, a currently running program, a game, or other similar program or feature that could be paired with the illumination of the tubular member 321. The light source may use more than one form of light to allow for continuous sensing of movement while the feature function is executed that illuminates the light-transmissive tubular member 321.

The exposed upper surface of the tubular member 321 can be configured to allow for user engagement with the tubular member 321. In one embodiment, the exposed upper surface of the tubular member 321 is arc-shaped in a longitudinal cross-section. In one embodiment, the exposed upper surface of the tubular member 321 is flat-shaped in a longitudinal cross-section. The rotational configuration of the tubular member 321 can be such that it is rotatable about a longitudinal axis. The tubular member 321 can further rotate so that the peripheral segments of the tubular member 321 rotate into and out of the body 370 of the handheld electronic device 300. In this embodiment at least a portion of the tubular member 321 is located within the body 370 of the handheld electronic communication device 300.

In addition to being used to control the motion of a cursor, screen highlighting, icon, graphical user interface (GUI), and the like, the optically based user input device can be used to enter a command, selection or the like into the device 300. To that end, in the embodiment illustrated in FIGS. 7A and 7B, the depressible suspension 234 of the optically based tubular member 321 can include a switch arrangement. In at least one embodiment as illustrated, the switch arrangement can be a domed switch 230, mounted on the printed circuit board 232 of the handheld electronic communication device 300. The dome switch 230 can be constructed such that it resiliently returns the user input device to the unactuated position. Thus, the surface of the optically based tubular member 321 may be depressed to make a selection or an entry into the handheld electronic communication device 300 by depressing the tubular member 321, thereby causing the domed switch 230 to depress and subsequently return back to the unactuated position when the user reduces or releases finger pressure on the light-transmissive tubular member 321.

Figure 9A:
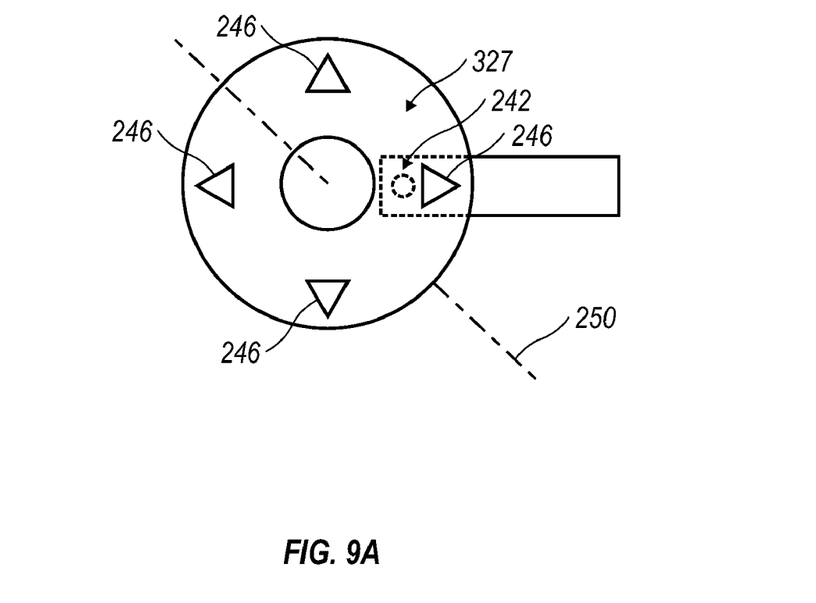
Figure 9B:
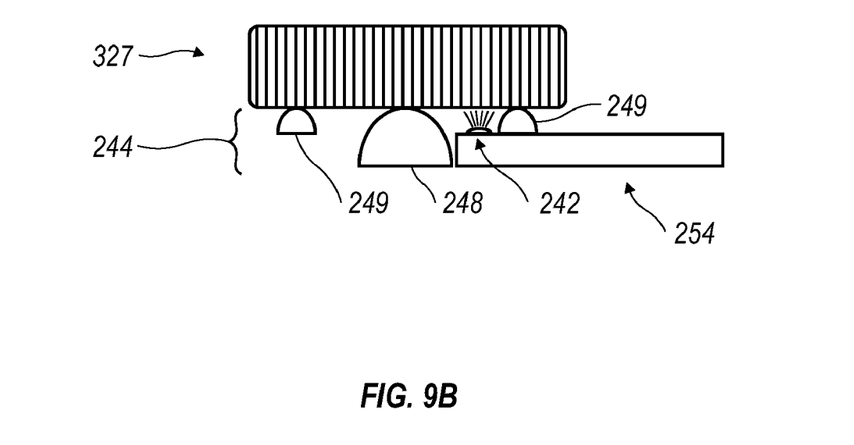
FIG. 9B illustrates a side elevation view of the optically based user input device of FIG. 9A.

Another embodiment of an optically based user input device is illustrated in FIGS. 8, 9A and 9B. This embodiment is a light-transmissive disc-shaped member 327 having at least a partially exposed upper surface that is rotatable about a center axis 250 and an optical image sensor 242. In one embodiment, at least a portion of the optically based user input device is located within the device body 370. The disc-shaped member 327 can have a size that is on the order of magnitude of a user's fingertip. Additionally, the disc-shaped member 327 can be rotationally supported to allow for rotation of the disc-shaped member 327 by the user. Furthermore, the disc-shaped member can have a switch arrangement 244, which can include one or more domed switches, located beneath the surface of the disc-shaped member 327. The switch arrangement 244 can be configured to detect the depression of the disc-shaped member 327. As in the previously disclosed embodiment, the optical image sensor 242 registers the image of the region of contact of the user's finger against the light-transmissive disc-shaped member 327. By comparing the subsequent image with a previous image, software within the handheld electronic communication device 300 can determine the direction and amount of movement of the light-transmissive disc-shaped member 327 as the user's finger moves over the disc-shaped member 327.

Furthermore, it is possible to configure the optical image sensor 242 to register motion of the disc-shaped member 327. In this configuration, the motion of the disc-shaped member 327 can be detected using a previous image of the disc-shaped member 327 and comparing its relative motion. In yet another embodiment, the optical image sensor 242 detects motion of the user's finger while the disc-shaped member 327 rotates. The detection of the finger movement can be as described above. In yet another embodiment, the optical image sensor 242 detects both finger movement and rotation of the disc-shaped member 327.

As illustrated, the optical image sensor 242 can be suitably mounted on a circuit board. This arrangement, as exemplary illustrated in FIGS. 9A and 9B, supports the light-transmissive disc-shaped member 327 from below and allows it to rotate about a center axis 250. The support for the disc-shaped member 327 can include a switch arrangement 244. The switch arrangement 244 can be configured in a variety of different embodiments. For example, the switch arrangement can be a domed switch on the printed circuit board of the handheld electronic communication device 300. The switch arrangement 244 can include a central dome switch 248 for detecting depression of the disc-shaped member. Additionally, in at least one embodiment, dome switches 249 are provided beneath the directional arrows 246. In this configuration, the dome switches allow for detection of a depression of the central portion of the disc-shape member or an area corresponding to one of the directional arrows 246. The directional arrows 246 and corresponding dome switches 249 allow the user to input commands associated with cursor navigation. For example, the directional cursor navigation command can include at least one of an up command, a down command, a left command, and a right command.

Exemplary embodiments have been described hereinabove regarding both handheld electronic communication devices 300 as well as the communication networks 319 within which they operate. Again, it should be appreciated that the focus of the present disclosure is providing an optically based user input device for inclusion on a handheld electronic communication device 300. Various modifications to and departures from the disclosed embodiments will occur to those having skill in the art. The subject matter that is intended to be within the spirit of this disclosure is set forth in the following claims.

What is claimed is:

1. A handheld electronic communication device, comprising:
    a body having a display screen
    an optically based user input device comprising:
        a light-transmissive disc-shaped member having an upper surface, the disc-shaped member being rotatable about an axis that is substantially perpendicular to the upper surface; and
        an image sensor in optical communication with at least a portion of the disc-shaped member, the image sensor positioned to detect a location of an external object that contacts the disc-shaped member; and
    a microprocessor communicatively coupled between the image sensor and the display screen, the microprocessor programmed to receive image signals from the image sensor and to generate signals for navigating a cursor on the display screen.

2. The handheld electronic communication device as recited in claim 1, wherein at least a portion of the optically based user input device is located within the device body.

3. The handheld electronic communication device as recited in claim 1, wherein the disc-shaped member is mounted upon a switch arrangement.

4. The handheld electronic communication device as recited in claim 1, further comprising a switch arrangement configured to be actuated upon depression of the disc-shaped member.

5. The handheld electronic communication device as recited in claim 4, wherein the switch arrangement is configured to output data representative of directional cursor navigation commands including at least one of an up command, down command, left command, and right command and based upon sensed depression of a portion of the disc-shaped member along a periphery of the disc.

6. The handheld electronic communication device as recited in claim 1, wherein said image sensor is located beneath the light-transmissive disc-shaped member within the body of the device.

7. The handheld electronic communication device as recited in claim 1, wherein said optically based user input device is located on a front face of the body of the device.

8. The handheld electronic communication device as recited in claim 7, wherein said optically based user input device is located below the display screen on said front face of the body of the device.

9. The handheld electronic communication device as recited in claim 7, wherein the optically based user input device is located to the right of the display screen on said front face of the body of the device.

10. The handheld electronic communication device as recited in claim 1, wherein the body of the device has a right side wall and said optically based user input device is located on said right side wall of the device.

\* \* \* \* \*